APPARATUS AND METHOD FOR ALTERING THE CONTRAST CHARACTERISTIC OF PHOTOSENSITIVE MATERIALS

Filed Jan. 16, 1963

Inventors.
Thomas M. Blain.
Billy J. Whitted.

By. Zabel, Baker, York, Jones & Dithmar
Attorneys.

United States Patent Office 3,332,332

Patented July 25, 1967

3,332,332

APPARATUS AND METHOD FOR ALTERING THE CONTRAST CHARACTERISTIC OF PHOTOSENSITIVE MATERIALS

Thomas M. Blain and Billy J. Whitted, Chicago, Ill., assignors to Fotorite, Inc., Chicago, Ill., a corporation of Illinois Filed Jan. 16, 1963, Ser. No. 251,952
7 Claims. (Cl. 95—73)

This invention relates to apparatus and method for altering in a controlled manner the contrast characteristic of photosensitive materials, and more particularly to apparatus and method for reducing from hard to soft gradations the contrast characteristic of photosensitive sheet materials.

One object of the invention is to provide apparatus and method whereby a photographer, or one engaged in printing positive photographs, may maintain an inventory of one contrast type, or a small number of contrast types, of photosensitive materials and yet have the benefit of materials possessing virtually all contrast characteristics. The invention makes it possible to obtain over one-hundred measurable contrast types from a single type of high contrast paper or film.

Another object is to provide apparatus and method whereby a photosensitive material may be exposed before or after exposure with a negative to alter its contrast characteristic so that the contrast is optimum for the particular negative and for the type of print desired. As is well known, negatives vary greatly in density characteristic, and to bring out on the positive all the detail recorded on the negative it is necessary to use photosensitive material having a properly selected contrast characteristic.

Still another object of the invention is to provide apparatus particularly suitable for exposing contact prints.

In brief, the apparatus of the invention comprises an electroluminescent panel of size large enough to receive in superposed relation the largest contemplated sheet of photosensitive material. Electroluminescent panels are available commercially from various manufacturers, for example General Electric Company. They consist of a phosphorescent material coated on a conductive sheet, the coated sheet sealed top and bottom with plastic material. When an alternating current voltage is applied to terminals of the panel, the phosphorescent coating luminesces instantaneously and emits a uniform, soft glow. The luminous level of the panel has a functional relationship with the value and frequency of the applied voltage.

The apparatus also includes a voltage control means whereby the voltage applied to the panel may be varied in a continuous manner, thereby accurately controlling the luminous level of the panel. It also includes a timing means for establishing accurately the exposure time. In the embodiment illustrated and described herein, the timing means has a fixed time period, although variable timing arrangements may be used if desired.

The method of the invention contemplates exposure of a photosensitive material by light of predetermined intensity for a predetermined exposure period, either before (pre-flash) or after (post flash) the material is exposed in taking or printing a photograph. The exposure provided by the invention is effective to reduce the contrast characteristic of the material to the contrast characteristic required by the negative or the desire of the photographer.

Other objects, advantages and details of the invention will be apparent as the description proceeds, reference being had to the accompanying drawing wherein one form of apparatus is shown. It is to be understood that the drawing and description are illustrative only, and that the scope of the invention is to be measured by the appended claims.

Figure 1:
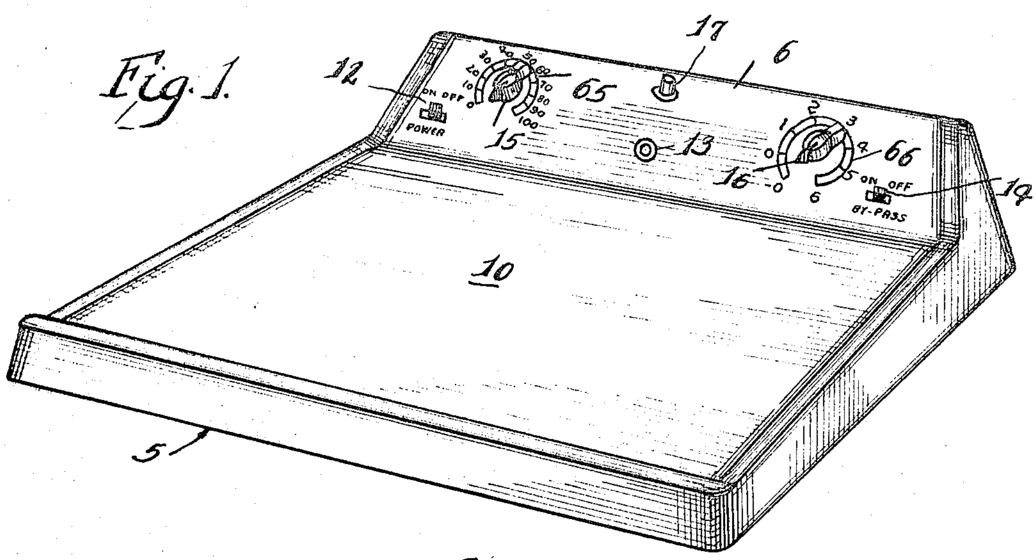
FIG. 1 is a perspective view of apparatus embodying the invention.

Referring to FIG. 1 of the drawing, the illustrated apparatus of the invention includes a generally rectangular housing 5 about fifteen inches square, for example. The upper surface of housing 5 gently slopes upwardly from front to rear, and the rear portion has an upwardly extending control panel 6.

An electroluminescent panel 10 mounted on the upper surface of housing 5 is substantially coextensive with that portion of the housing. By way of example, panel 10 may be 11¾ inches by 14 inches in size, and have a maximum 60 cycle power consumption of about three watts.

The external controls for the apparatus, all shown mounted on control panel 6, include actuator 12 of an off-on power switch, an indicator lamp 13 for showing the condition of the power switch, actuator 14 of a by-pass switch, a range control 15, a contrast control 16 and an actuator 17 for the timing means. The function and character of these several controls will be apparent from the following description of the illustrated electrical circuit.

Figures 2, 3:
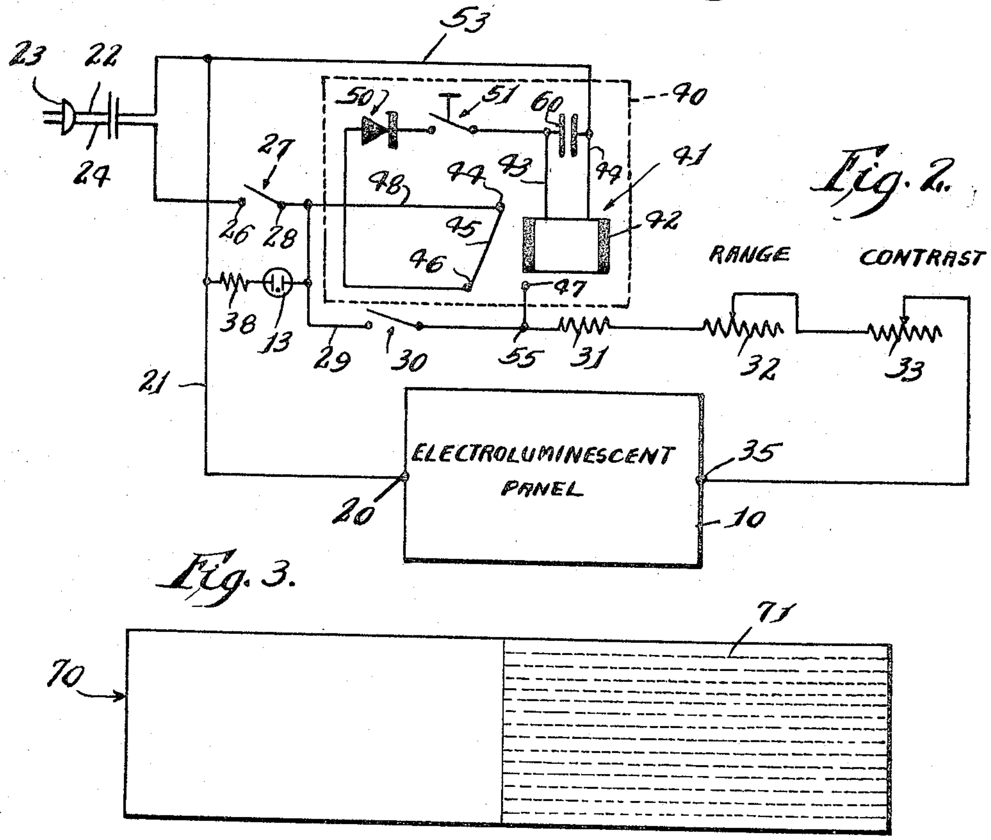
FIG. 2 is a schematic diagram showing an exemplary electrical circuit for use in the invention.
FIG. 3 is a top plan view of a test strip of photographic material, such test strip typifying one of a series of test strips used in the method of the invention.

Referring to FIG. 2 of the drawing, the electroluminescent panel again is designated by the numeral 10. Terminal 20 of panel 10 is connected by conductor 21 to lead 22 of a power plug 23. The latter is adapted to be connected to a convenience outlet providing electrical power at commercial alternating current voltage, namely 110–120 volts. Other lead 24 from plug 23 is connected to one terminal 26 of an off-on power switch 27. Previously mentioned actuator 12 is part of switch 27.

Other terminal 28 of switch 27 is connected by lead 29 to by-pass switch 30, the circuit proceeding through series connected resistance 31, range potentiometer 32 and contrast potentiometer 33 to other terminal 35 of panel 10. Resistance 31, which may have a value of about 100 ohms, performs a current limiting function to protect potentiometers 32 and 33, and the potentiometers serve to control and vary the voltage applied to panel 10.

In one commercial embodiment of the invention, range potentiometer 32 has a maximum resistance value of 15,000 ohms and contrast potentiometer 33 has a maximum resistance value of 5,000 ohms.

Previously mentioned indicator lamp 13, which may be a neon lamp, and a limiting resistance 38 are connected in series between leads 21 and 29, lamp 13 glowing when off-on power switch 27 is closed. By-pass switch 30, when power switch 27 is closed, enables panel 10 to be energized independently of action by the timing means which now will be described.

The illustrated exemplary timing means is enclosed in the rectangle shown in broken line 40. It includes a relay switch mechanism 41 having a coil 42 with leads 43 and 44. Mechanism 41 also includes a normally closed switch and a normally open switch, the two switches shown diagrammatically as having a common or first terminal 44 connected to a movable switch arm 45, the latter adapted alternately to engage second terminal 46 forming part of the normally closed switch and third terminal 47 forming part of the normally open switch.

Terminal 28 of off-on power switch 27 is connected by lead 48 to common terminal 44 of relay switch mechanism 41, the circuit proceeding through movable switch arm 45, switch terminal 46, a rectifier means 50 and initiating switch 51 to lead 43 of relay coil 42. Other lead 44 of relay coil 42 is connected by conductor 53 to power lead 22.

Terminal 47 of the normally open relay switch is connected to junction 55 between by-pass switch 30 and limiting resistance 31.

A capacitor 60, which may be of the electrolytic type and have a value of about 150 mfd., is connected between leads 43 and 44 of relay coil 42. As will be seen, when capacitor 60 acquires a predetermined charge, it discharges through relay coil 42, thereby actuating relay switch mechanism 41.

When a timed period of panel luminescence is desired, initiating switch 51, which may be of the push-button type, is closed momentarily. Rectified current from rectifier means 50 serves to charge capacitor 60. When the voltage across capacitor 60 reaches predetermined level, for example 100 volts, relay switch mechanism 41 automatically is actuated, thereby opening the normally closed relay switch and closing the normally open relay switch. Switch arm 45, of course, moves from terminal 46 to terminal 47 when mechanism 41 is actuated.

The then-closed normally open switch comprising common terminal 44, switch arm 45, and terminal 47 connects panel 10 and its associated voltage control means to power leads 22 and 24, thereby causing panel 10 to luminesce instantaneously and uniformly to a luminous level depending on the settings of the range and contrast potentiometers 32 and 33.

Relay switch mechanism 41 is adapted to return to original condition and darken panel 10 after a predetermined time period near the end of the discharge of capacitor 60, for example at a time when the voltage across the capacitor falls below 8 volts. The circuit elements in the illustrated timing circuit are such as to provide a time interval of 1.75 seconds with plus or minus 10% accuracy.

From the foregoing, it is apparent that the apparatus of the invention is adapted to expose a photosensitive material for a predetermined, fixed time period at a luminous level that is established by the adjusted settings of potentiometers 32 and 33. For convenience, control panel 6 of housing 5 has scales 65 and 66 in operative relation with range control 15 and contrast control 16, respectively.

Referring to FIG. 3, there is shown a test strip 70 that typifies one of a series of more or less similar test strips used with the apparatus and method of the invention. Test strip 70 is cut from a sheet of a plurality of sheets of photosensitive material having the same high contrast characteristic.

The apparatus of the invention first is used to ascertain the speed range of the emulsion on the photosensitive material, and particularly on the test strips cut therefrom. With range control 15 set for example at "50" on the associated scale 65 and contrast control 16 set for example at "—0" on scale 66, a test strip 70 is placed emulsion-side down on panel 10 so that about one-half of the test strip overlies the panel and the other half extends off the panel and away from the influence of light emitted from the panel.

Actuator 17 of initiating switch 51 is moved to switch-closing position and immediately released, thereby causing operation of timing means 40 and luminescence of panel 10 for the period established by the timing means.

Following exposure, test strip 70 is processed in convenient manner, making sure that time and temperature conditions are the same as used in later processing. If the range control were set at proper position for the particular emulsion of the test strip, the exposed area of the strip will have slight, pale gray visible density. If the exposed portion is darker or lighter than slight, pale gray, successive test strips should be exposed and processed with different settings of range control 15.

The setting that provides the slight, pale gray visible density in a test strip 70, designated by lined area 71 in FIG. 3, is the setting number that should be noted and recorded as the speed index for the photosensitive material being tested. Material exposed at that luminous level, of course, has a different and lower contrast characteristic than the same material prior to exposure. In general, this characteristic is minimum contrast.

Various other contrast characteristics with materials of the same original type are achieved by varying the adjustment of contrast control 16, thereby providing pre-flashed material having virtually all contrast gradations.

As previously mentioned, it sometimes is desirable in certain situations to expose the material for contrast alteration after it has been exposed with a photographic negative in conventional manner. The present apparatus and method contemplate this post flashing procedure. It will be seen that post flash, as compared to pre-flash, will "snap" the contrast range slightly.

In using the apparatus as a contact printer, the illustrated timing means 40 is not used. Rather, the apparatus may be connected to a power source through any suitable timer that provides the required exposure interval, and power and by-pass switches 27 and 30 are set to "on" position.

One main use of the present apparatus and method is in the dark room of a photographer who desires the widest possible choice of contrast characteristics in his photosensitive material. With the invention, the photographer needs to stock only one type high-contrast material, and with this single type he is able to obtain the contrast characteristic required by any situation. In other words, it now is possible to minimize the wide variety of different materials that formerly were necessary to meet all requirements.

The invention also makes it possible to print quality photographs from even the most dense negatives, as the apparatus and method of the invention make it possible to reduce the contrast of any material to minimum contrast grade. Details that previously could not be reproduced now are able to be printed with ease. For instance, delicate details in wedding gowns, fine table cloths, delicately carved objects, etc. can be printed if recorded on the negative.

Medical and scientific photographers will find the invention highly useful. Dense X-ray and metallurgical negatives can be printed with great detail and clarity because of the ability of the invention to provide correct contrast characteristics for those specific needs.

The invention also is highly useful in the graphic arts field. High quality screen prints can be produced with little difficulty, and the contrast of the litho film can be more accurately reduced for half-tone reproduction. With the invention, it is possible to use a sheet of high-contrast litho film and accurately reduce the contrast to produce continuous tone negatives.

By using the apparatus and method of the invention it is possible to select from an almost infinite number of contrast ranges not available with rigid contrast sheets or any other multiple contrast system. While other systems achieve certain contrast extensions by increased or decreased development, such procedure does not effect a true contrast change, but merely a shift in overall print density. The invention also has marked superiority over the contrast variations afforded by filter systems using paper sheets having emulsions designed for filter contrast control.

From the above description, it is thought that the construction, practice and advantages of the invention will be readily apparent to those skilled in the art. Various changes in detail may be made without departing from the spirit or losing the advantages of the invention.

Having thus described the invention, what is claimed as new and desired to secure by Letters Patent is:

1. Apparatus for altering the contrast characteristic of comparatively high contrast photosensitive material in a controlled and accurately duplicatable manner, comprising:

an electroluminescent panel which luminesces instantaneously and uniformly to a luminous level having a functional relationship with the magnitude of applied voltage, said panel adapted to receive sheets of photosensitive material in overlying relation;

an electric power source adapted to be connected to said panel;

a timing switch means in circuit with said power source and said panel, said timing switch means when actuated establishing a fixed period of panel luminescence; and a voltage magnitude control means in circuit with said power source, said timing switch means and said panel, said control means effective to vary the magnitude of the voltage applied to said panel in a continuous manner and including in series a variable range resistance for coarse adjustment adapted to be adjusted in accordance with the speed range of the comparatively high contrast photosensitive material from a particular emulsion batch and a variable contrast resistance for fine adjustment adapted on successively different adjustments to provide light levels whereby respective sheets of photosensitive material from the same emulsion batch when exposed to the luminescence for the period provided by said timing switch means are given altered different contrast characteristics, whereby printing of optimum contrast characteristic can be accomplished with sheets of comparatively high contrast photosensitive material from different emulsion batches and with negatives of different density characteristics.

2. The combination of claim 1 wherein said range resistance has a maximum resistance value of about 15,000 ohms and said contrast resistance has a maximum resistance value of about 5,000 ohms.

3. The combinatioin of claim 1 wherein said timing switch means includes a relay having a coil, a movable switch arm, a normally closed switch and a normally open switch, said switch arm movable to open and close said switches alternately, a capacitor connected across said coil, direct current means for charging said capacitor, said normally closed switch connected in circuit with said direct current means and said capacitor, said normally open switch connected between said power source and said panel, and an initiating switch in series with said normally closed switch and effective to start a timed period.

4. The combination of claim 3 wherein said direct current means includes a rectifier means connected to said power source.

5. The method of making a photographic print of optimum contrast characteristic from one of a plurality of negatives of different density characteristics on a sheet of comparatively high contrast photosensitive material embodying emulsion from one of a plurality of emulsion batches, comprising the steps of:

discriminating the speed range of the emulsion of the comparatively high contrast photosensitive material by exposing portions of test strips of the material to light from an electroluminescent panel for uniform times at successively different light levels and noting the light level that produces slight, pale gray visible density in the exposed portion of a developed test strip;

exposing sheets of said photonsensitive material for said uniform time to light from the electroluminescent panel respectively at said noted light level and at successively slightly lower light levels to obtain a set of sheets of photosensitive material having different contrast characteristics; and exposing the sheet of the set suited to the density characteristic of the negative to be printed through the negaive and developing same.

6. The method of making a photographic print of optimum contrast characteristic from one of a plurality of negatives of different density characteristics on a sheet of comparatively high contrast photosensitive material embodying emulsion from one of a plurality of emulsion batches, comprising the steps of:

discriminating the speed range of the emulsion of the comparatively high contrast photosensitive material by exposing portions of test strips of the material to light from an electroluminescent panel for uniform times at successively different light levels and noting the light level that produces slight, pale gray visible density in the exposed portion of a developed test strip;

exposing sheets of said photonsensitive material for said uniform time to light from the electroluminescent panel at a light level of the order of the noted light level to obtain a sheet having an altered contrast characteristic, the precise exposure light level selected in accordance with the density characteristic of the negative to be printed; and exposing said altered sheet through the negative and developing same.

7. The method for altering the contrast characteristic of comparatively high contrast photosensitive material embodying emulsion from one of a plurality of emulsion batches, comprising the steps of:

discriminating the speed range of the emulsion of the comparatively high contrast photosensitive material by exposing portions of test strips of the material to light from an electroluminescent panel for uniform times at successively different light levels and noting the light level that produces slight, pale gray visible density in the exposed portion of a developed test strip; and exposing a sheet of the photosensitive material for said uniform time to light from the electroluminescent panel at a light level of the order of the noted light level to obtain a sheet having an altered contrast characteristic, the precise exposure light level selected in accordance with the density characteristic of a negative to be printed on the sheet.

References Cited

UNITED STATES PATENTS

| | | | |
|---|---|---|---|
| 2,227,850 | 1/1941 | Steinlauf | 96—27 |
| 2,352,914 | 7/1944 | Rackett | 96—27 |
| 2,726,587 | 12/1955 | Bartley | 95—73 |
| 2,728,845 | 12/1955 | Potter | 95—73 |
| 2,789,053 | 4/1957 | Elliott | 96—27 |
| 2,909,692 | 10/1959 | Cusano | 96—27 |
| 2,921,512 | 1/1960 | Craig | 96—27 |
| 2,949,811 | 8/1960 | Weisglass | 96—73 |
| 2,960,019 | 11/1960 | Craig | 95—73 |
| 3,035,912 | 5/1962 | Le Massena et al. | 96—27 |
| 3,035,913 | 5/1962 | Hellmig | 96—27 |
| 3,047,762 | 7/1962 | Edens et al. | 313—108.1 |
| 3,050,654 | 8/1962 | Toulon | 313—108 |
| 3,071,708 | 1/1963 | Stanavage | 313—108 |
| 3,119,317 | 1/1964 | Cooper | 313—108 |

OTHER REFERENCES

Nibbelink, Bigger and Better, The Book of Enlarging, published by John P. Smth Co., Inc. Rochester, N.Y., 1952, pp. 70, 71 and 121 to 126.

The Focal Encyclopedia of Photography, vol. II, 1959, pp. 1185–6.

NORMAN G. TORCHIN, *Primary Examiner.*

A. E. TANENHOLTZ, J. H. RAUBITSCHEK, *Assistant Examiners.*